United States Patent
Banowetz et al.

(10) Patent No.: US 10,520,093 B1
(45) Date of Patent: *Dec. 31, 2019

(54) RADIAL SHAFT SEAL

(71) Applicant: Engineered Seal Products, Inc., Cedar Rapids, IA (US)

(72) Inventors: Matt Banowetz, Cedar Rapids, IA (US); Andrew Rommann, Cedar Rapids, IA (US); Mark Reimer, Coralville, IA (US); Dale Schumann, Cedar Rapids, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/470,097

(22) Filed: Mar. 27, 2017

Related U.S. Application Data

(63) Continuation of application No. 14/147,878, filed on Jan. 6, 2014, now Pat. No. 9,638,327.

(60) Provisional application No. 61/752,564, filed on Jan. 15, 2013.

(51) Int. Cl.
*F16J 15/32* (2016.01)
*F16J 15/3232* (2016.01)
*F16J 15/3284* (2016.01)

(52) U.S. Cl.
CPC ....... *F16J 15/3232* (2013.01); *F16J 15/3284* (2013.01)

(58) Field of Classification Search
CPC .......... F16J 15/16; F16J 15/32; F16J 15/3204; F16J 15/322; F16J 15/3224; F16J 15/3268; F16L 17/035
See application file for complete search history.

(56) References Cited

U.S. PATENT DOCUMENTS

| | | | | |
|---|---|---|---|---|
| 3,390,890 A | * | 7/1968 | Kurtz | F16L 17/035 277/625 |
| 4,174,125 A | * | 11/1979 | Wyss | B29C 33/505 285/110 |
| 4,298,206 A | * | 11/1981 | Kojima | F16L 17/035 277/626 |
| 4,362,323 A | * | 12/1982 | Lodder | B29C 57/025 285/110 |
| 4,699,526 A | * | 10/1987 | Sato | F16C 33/7876 277/351 |
| 4,781,024 A | * | 11/1988 | Nakamura | B60T 11/236 277/558 |
| 4,964,647 A | * | 10/1990 | Stephan | F16J 15/3204 277/560 |

(Continued)

*Primary Examiner* — Vishal A Patel
(74) *Attorney, Agent, or Firm* — Shuttleworth & Ingersoll, PLC; Jason Sytsma

(57) ABSTRACT

Radial shaft seal includes an outer diameter member, a primary sealing lip, and a lip energizer. The primary sealing lip is spaced radially from the outer diameter member. The lip energizer is positioned radially between the outer diameter member and the primary sealing lip. The lip energizer moves to an engaging position with the outer diameter member forming a section of material between the outer diameter member and the primary sealing lip. The outer diameter member, the primary sealing lip, and the lip energizer can be formed from a single piece of material, and in one embodiment, an elastomer.

15 Claims, 5 Drawing Sheets

(56) References Cited

U.S. PATENT DOCUMENTS

| | | | | |
|---|---|---|---|---|
| 5,056,833 A | * | 10/1991 | Webb | F16L 17/04 |
| | | | | 285/148.23 |
| 5,328,178 A | * | 7/1994 | Nies | B60T 11/236 |
| | | | | 277/438 |
| 5,431,415 A | * | 7/1995 | Millonig | F16J 15/3236 |
| | | | | 277/353 |
| 5,738,358 A | | 4/1998 | Kalsi et al. | |
| 5,799,953 A | | 9/1998 | Henderson | |
| 6,857,637 B2 | * | 2/2005 | Hosokawa | F16J 15/164 |
| | | | | 277/552 |
| 8,297,626 B2 | * | 10/2012 | Schaefer | F16J 15/025 |
| | | | | 102/469 |
| 2005/0110219 A1 | | 5/2005 | Tsuboi et al. | |
| 2008/0029970 A1 | | 2/2008 | Krausz et al. | |
| 2008/0217865 A1 | | 9/2008 | Sedlar et al. | |
| 2012/0228829 A1 | | 9/2012 | Sedlar et al. | |

\* cited by examiner

RADIAL SHAFT SEAL

This application is a continuation of application Ser. No. 14/147,878 filed Jan. 6, 2014 which application claims priority to U.S. provisional patent application No. 61/752,564, filed on Jan. 15, 2013 and titled, "Radial Shaft Seal," the contents of which are hereby incorporated herein by reference.

BACKGROUND OF THE INVENTION

The present disclosure relates generally to molded shaft seals, and more specifically, this disclosure relates to a radial shaft seal for preventing the loss of fluid and preventing ingress of contaminants around a rotating radial shaft.

There are various types of radial shaft seals with multiple lips to keep environmental debris out of the sealed interior area, steel springs to bias the lips into engagement with the radial shaft, and a steel can pressed into a housing bore. The combination of elastomeric material, steel springs, and a steel can increase the cost of manufacturing the seal by increasing material cost and assembly cost.

A need exists for a less-expensive radial shaft seal.

SUMMARY OF THE INVENTION

A radial shaft seal is provided. The radial shaft seal includes an outer diameter member, a primary sealing lip, and a lip energizer. The primary sealing lip is spaced radially from the outer diameter member. The lip energizer is positioned radially between the outer diameter member and the primary sealing lip. The lip energizer moves to an engaging position with the outer diameter member forming a section of material between the outer diameter member and the primary sealing lip. The outer diameter member, the primary sealing lip, and the lip energizer can be formed from a single piece of material, and in one embodiment, an elastomer.

In one embodiment, the lip energizer biases the primary sealing lip into the radial shaft. The outer diameter member moves radially toward the lip energizer when the radial shaft seal is installed in a housing. The lip energizer moves radially toward the outer diameter member when the radial shaft seal is installed around a radial shaft. The engagement of the lip energizer with the outer diameter member allows the lip energizer to bias the primary sealing lip into the radial shaft.

In an embodiment, a cavity positioned axially from the section of material is formed. In such embodiments, at least one relief passage formed in the lip energizer relieves negative or positive pressure in the cavity.

Various other objects, features and attendant advantages of the present invention will become fully appreciated as the same becomes better understood when considered in conjunction with the accompanying drawings, in which like reference characters designate the same or similar parts throughout the several views.

DETAILED DESCRIPTION

Figure 5:
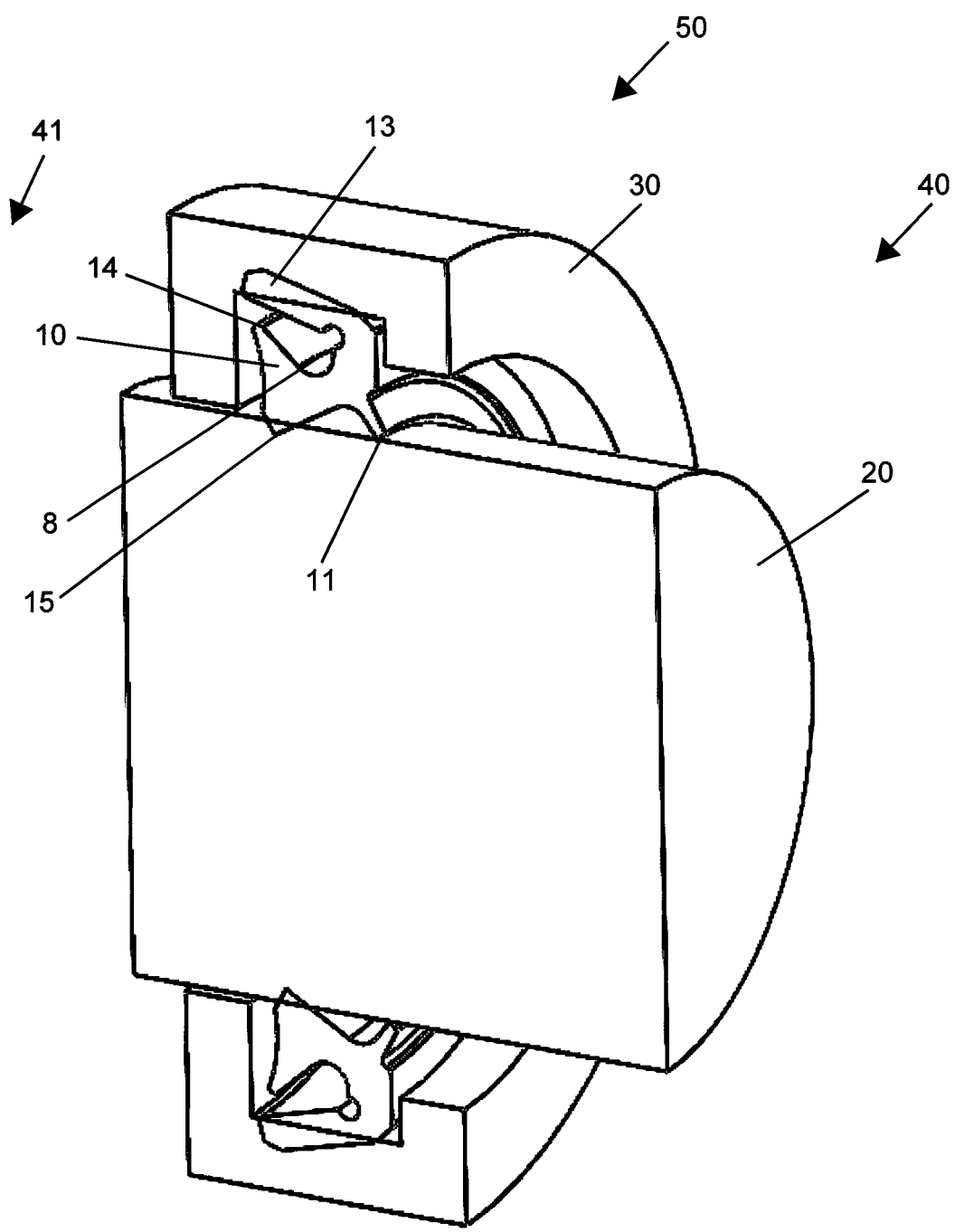
FIG. 5 is a cross-sectional view of an assembly of the radial shaft seal, shaft, and the housing.

FIG. 5 shows a system 50, including radial shaft seal 10, a radial shaft 20 that passes through the center of radial shaft seal 10, and a housing bore into which radial shaft seal 10 is installed. Radial shaft seal 10 can be molded as a single piece of elastomer and installed in housing 30 with radial shaft 20 passing through the center. Radial shaft seal 10 can be an axially symmetric elastomer constructed shaft seal that installs in the bore of housing 30 to prevent the loss of fluid from system 50 or the ingress of contamination into an interior side 41 of system 50 forming a barrier between exterior-facing side 40 and an interior-facing side 41 of radial shaft seal 10.

Once installed, radial shaft seal 10 includes two sealing surfaces. The first sealing surface is a tight static seal formed from an interference fit between an outer diameter member 13 of radial shaft seal 10 and the bore of housing 30. The outer diameter of outer diameter member 13 of radial shaft seal 10 is slightly larger than the bore of housing 30 to ensure a tight press fit that prevents leakage around outer diameter member 13, which also keeps radial shaft seal 10 retained in the bore of housing 30.

The second sealing surface is formed between a primary sealing lip 15 and shaft 20. Primary sealing lip 15 is a dynamic seal formed by biasing primary sealing lip 15 against shaft 20. Primary sealing lip 15 is formed by an primary lip air angle 17 and a primary lip oil angle 18 (shown in FIG. 2), and constructed to prevent the ingress of contaminants and loss of fluid from system 50. More specifically, primary sealing lip 15 comprises of a first contact point 60 formed by a meeting of a first surface 62 and a second surface 64 with primary lip air angle 17 between first surface 62 and axis 200 and primary lip oil angle 18 between second surface 64 and axis 200 with primary lip oil angle 18 being greater than primary lip air angle 17. Radial shaft seal 10 can also include one or more dust lip(s) 11 as a front line of protection against foreign debris from getting into interior side 41 of system 50. Dust lip 11 can comprise a second contact point 66 formed by a meeting of a third sealing surface 68 and a fourth sealing surface 70. First contact point 60 and second contact point 66 are parallel with respect to each other. Also, first surface 62 and fourth surface 70 are connected by a concave radius 72 oriented away from axis 200.

Figure 1:
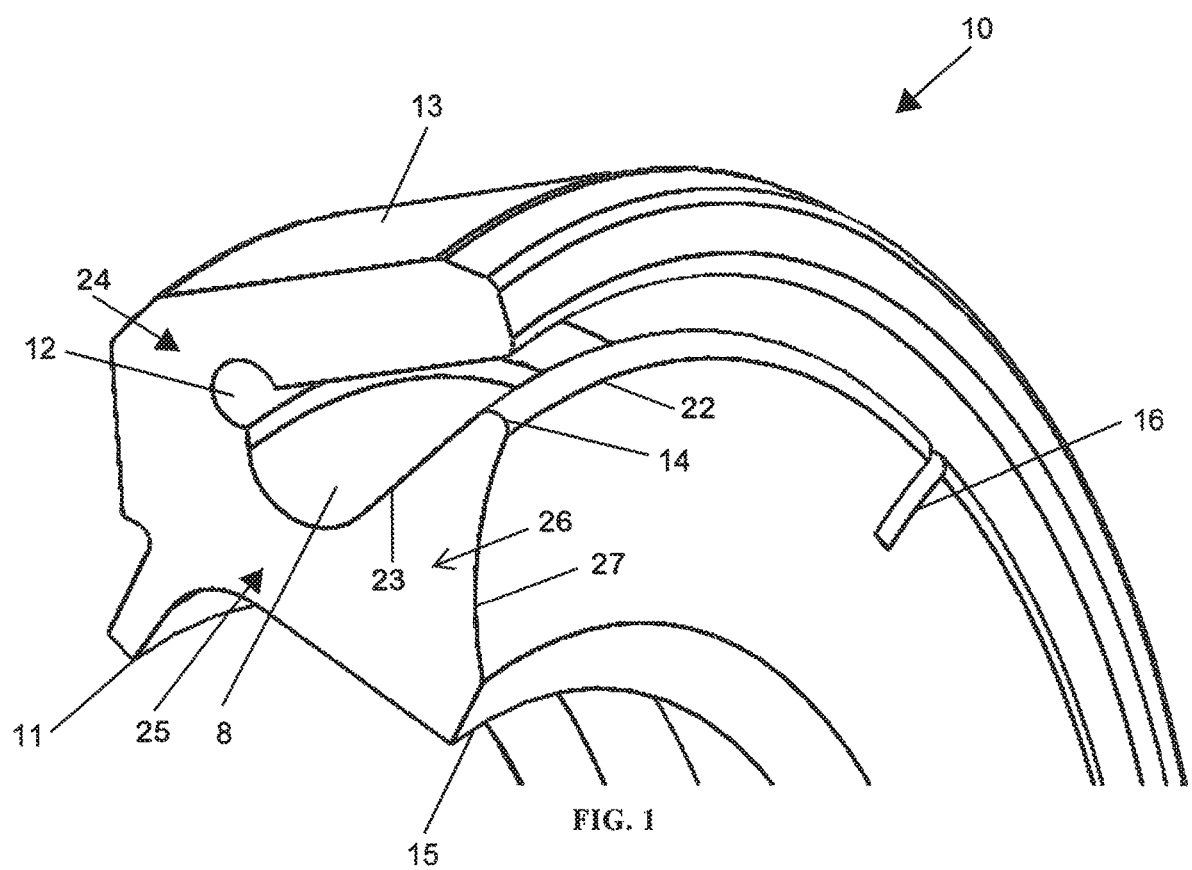
FIG. 1 is an upper perspective cross sectional view of a radial seal before installation in accordance with an embodiment of this disclosure.
Figure 2:
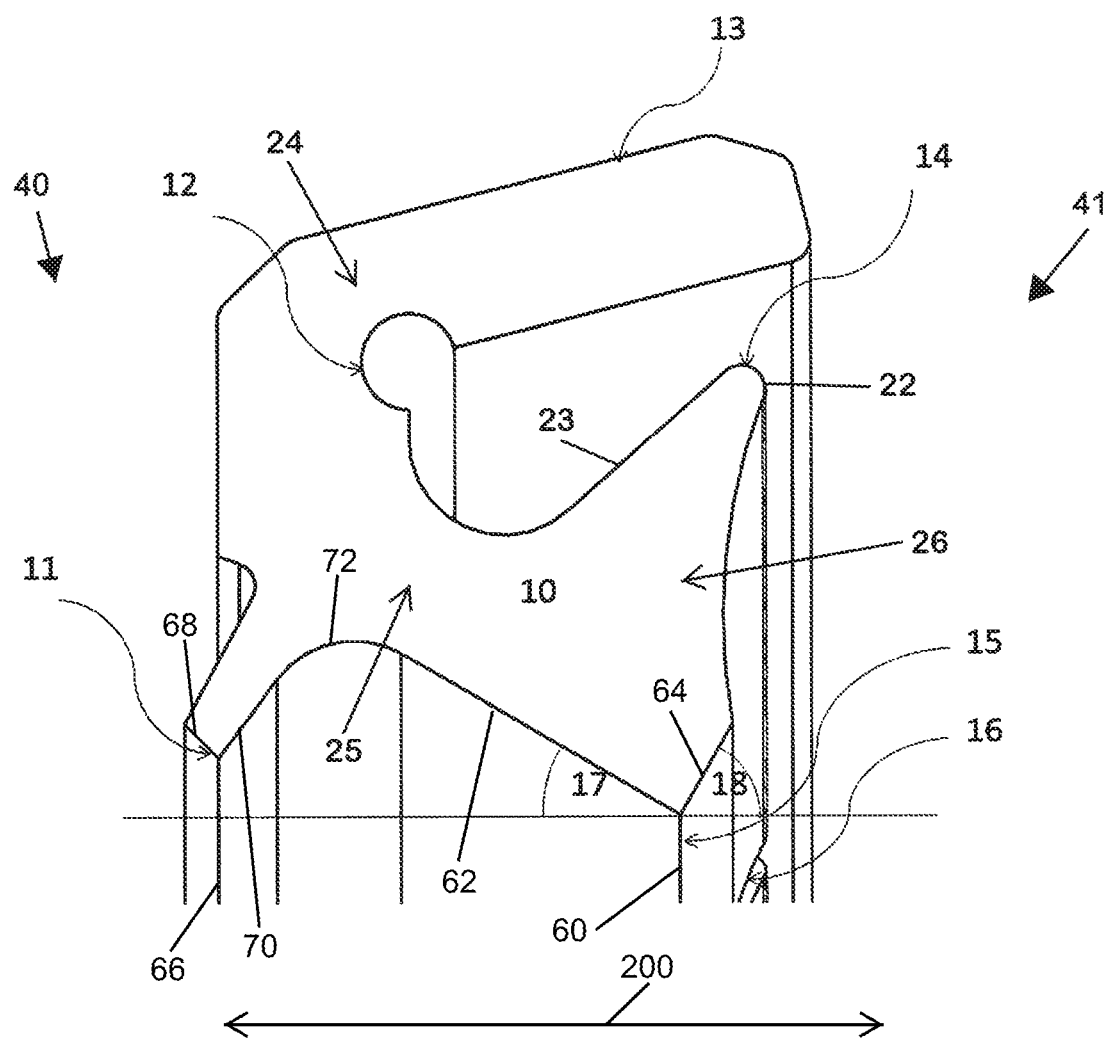
FIG. 2 is a cross-sectional view of the seal showing the seal geometry.
Figure 3:
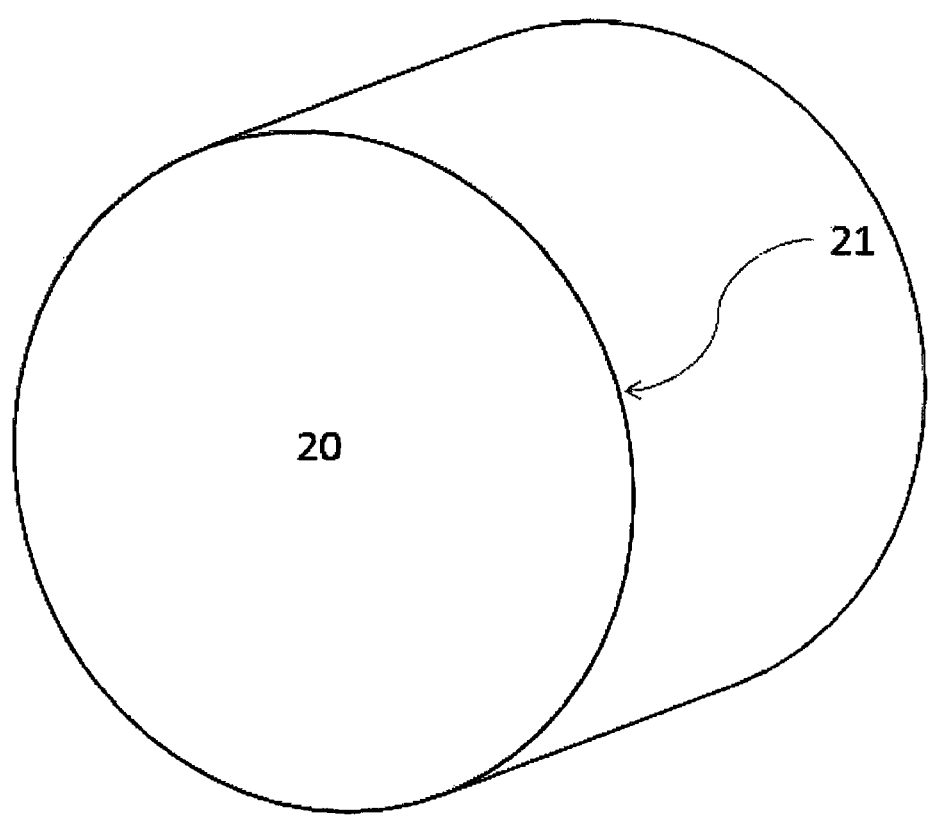
FIG. 3 is a cross-sectional view of an outer diameter of a shaft.
Figure 4:
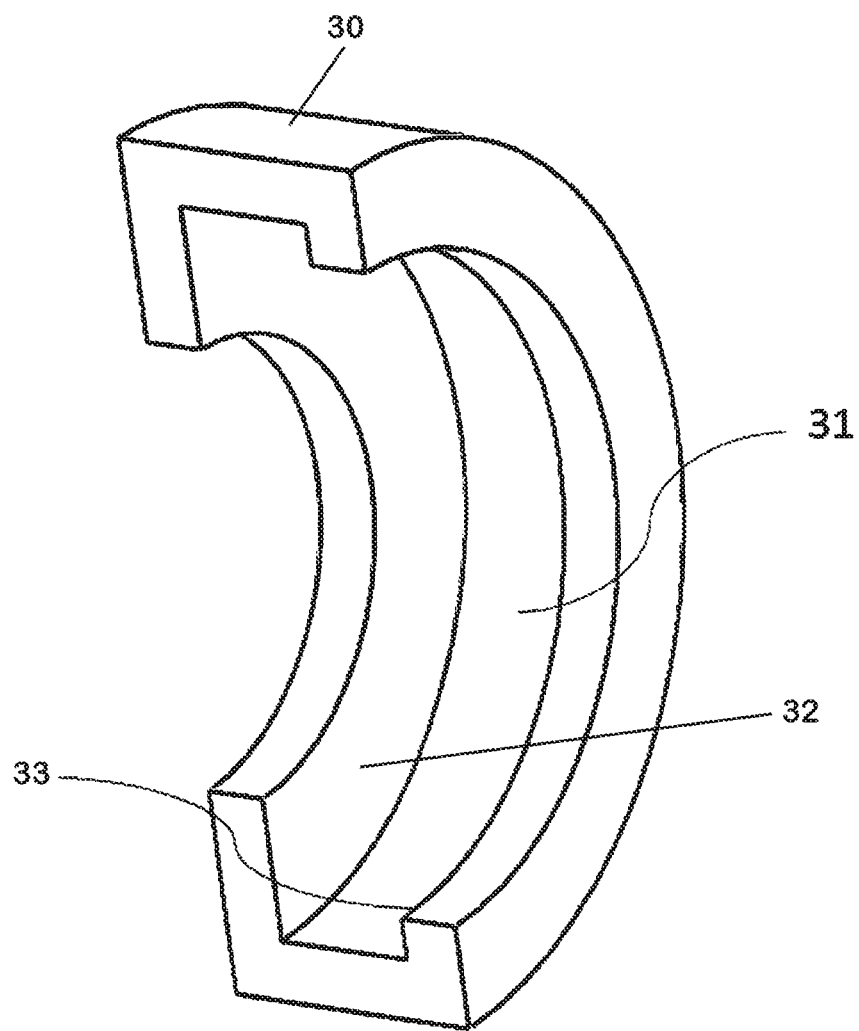
FIG. 4 is a cross-sectional view of an inner diameter, inner face, and retaining lip of a housing.

FIGS. 1 and 2 show a cross-sectional profile of radial shaft seal 10. Radial shaft seal 10 comprises of a seal body formed around an axis 200. An outer diameter member 13 of radial shaft seal 10 provides an interference fit with an inner diameter 31 of the housing, as described above in connection with the first sealing surface. When radial shaft seal 10 is installed in the bore of housing 30, outer diameter member 13 moves radially inward toward the lip energizer 14. A cut-out 12 can be added to provide flexibility for outer diameter member 13 to allow for easier installation of radial shaft seal 10 into housing 30. In an alternative embodiment, cut-out 12 is replaced with a radius 12 to provide the needed resiliency for outer diameter member 13. Either cut-out 12 or radius 12 can be modified with its dimensions changed in any manner to accommodate the resiliency of the material used for constructing radial shaft seal 10.

A lip energizer 14 provides interference with outer diameter member 13 to load a primary sealing lip 15. Lip energizer 14 moves radially toward outer diameter member 13 when radial shaft seal 10 is installed around a radial shaft 20. More specifically, lip energizer 14 comprises of a top lip 22 and an inner surface 23 on one side of lip energizer 14 and a concave surface 27 on the other side of lip energizer 14. Inner surface 23 slopes radially downward, with respect to top lip 22 and outer diameter member 13, and axially inward, with respect to primary sealing lip 15 and top lip 22. Lip energizer 14 is positioned radially between outer diameter member 13 and primary sealing lip 15. A first area of pivot movement 24 is combined to outer diameter member 13 for creating strain that resists compression of outer diameter member 13. A second area of pivot movement 25 is combined to lip energizer 14 for creating strain that resists compression of lip energizer 14. A third area of pivot movement 26 is combined to lip energizer for creating strain that resists compression of lip energizer 14. In the installed position, lip energizer 14 is flexed toward outer diameter member 13 by second area of pivot movement 25. Outer diameter member 13 is flexed toward lip energizer 14 by first area of pivot movement 24 to form a section of material between outer diameter member 13 and primary sealing lip 15. Furthermore, as outer diameter member 13 and lip energizer 14 are compressed, outer diameter member 13 slides down surface 23 and third area of pivot movement 26 between inner surface 23 and concave surface 27 creates strain that resists compression of lip energizer 14.

When radial shaft seal 10 is installed in the bore of housing 30 and around radial shaft 20, as shown in FIG. 5, outer diameter member 13 pivots downward toward lip energizer 14, and lip energizer 14 pivots upward toward outer diameter member 13 until the two touch or engage each other. The result is a section of material between primary sealing lip 15 and outer diameter member 13 that allows lip energizer 14 to bias primary sealing lip 15 toward radial shaft 20. This section of material can be continuous, and can be radially oriented forming a column extending from primary sealing lip 18 through lip energizer 14 to outer diameter member 13. Lip energizer 14 can also be curved more generally outward than shown or curved inward. Moreover, lip energizer 14 can extend radially downward from outer diameter member 13 and contact a surface above primary sealing lip 18. As a result, radial shaft seal 10 can function without a separate spring to bias the primary sealing lip 15 into engagement with radial shaft 20. The spring is replaced with lip energizer 14.

A cavity 8 may be formed axially away from the section of material, which is formed by the contact of outer diameter member 13 and lip energizer 14, in the space provided for outer diameter member 13's residency. Cavity 8, however, can be a source of positive or negative pressure during operation of system 50 with radial shaft seal 10 installed and either radial shaft 20 or housing 30 rotating with respect to radial shaft seal 10, so one or more relief passage(s) 16 can be cut in lip energizer 14 to prevent the accumulation of pressure or vacuum in cavity 8.

As previously stated, radial shaft seal 10 can be installed around a shaft 20. Shaft 20 is typically constructed from a rigid material, is axially symmetric, and passes through the center of radial shaft seal 10 to create interference fit with primary sealing lip 15 of radial shaft seal 10 to prevent the loss of fluid. Shaft 20 also creates an interference fit with dust lip 11 to prevent the ingress of unwanted foreign material into the interior facing side 41. Even with variations to shaft 20 including modifications to outer diameter 21 and surface finish, radial shaft seal 10 can create an interference fit with primary sealing lip 15 and dust lip 11 to keep unwanted foreign material out of interior facing side 41 of system 50.

The function of housing 30 is to provide the space for installation of the radial shaft seal 10 that can create appropriate interference fits with the outer diameter member 13 and primary sealing lip 15 of radial shaft seal 10 to prevent the loss of fluid around the outer diameter of shaft 20, as well generating static friction great enough to prevent the rotation of radial shaft seal 10 during normal operation.

Housing 30 can be constructed from a rigid material that can allow the installation and retention of the radial shaft seal 10. Housing 30 can provide appropriate interference fits with the radial shaft seal 10 to prevent the loss of fluid from outer diameter member 13 of radial shaft seal 10 and from primary sealing lip 15 of the radial shaft seal 10. Housing 30 also creates interference fit with radial shaft seal 10 to prevent the rotation of radial shaft seal 10 within housing 30 during normal operation. An inner face 32 and a retaining lip 33 of housing 30 can provide a contact surface that engages radial shaft seal 10.

Radial shaft seal 10 can be installed into housing 30 with primary sealing lip 15 facing toward the oil or interior-facing side 41 of system 50 and the dust lip 11 facing toward an air or exterior-facing side 40 of system 50. Outer diameter 13 of the radial shaft seal 10 can contact inner diameter 31 of housing 30. Outer diameter member 13 of radial shaft seal 10 can deform after installation into housing 30 by pivoting downward. Shaft 20 can be inserted into the center of radial shaft seal 10 after radial shaft seal 10 is installed into housing 30. The installation of shaft 20 can cause lip energizer to deform and pivot upward. The result is a section of material between the bore of housing 30 and radial shaft 20 formed by the engagement of lip energizer 14 and outer diameter member 13 and extending down through primary sealing lip 15. This section of material has an interference fit between radial shaft 20 and housing 30.

Variations to radial shaft seal 10 may include modification of the geometry of lip energizer 14 to increase or decrease the load applied to primary sealing lip 15. Outer diameter member 13 of radial shaft seal 10 may also be modified to provide the appropriate interference with inner face 32 and retaining lip 33 of housing 30. The primary lip air angle 17 and primary lip oil angle 18 may be further modified by increasing or decreasing their respective angles to create more desirable interference and sealing characteristics.

Radial shaft seal 10 prevents the ingress of contaminants and the loss of fluid around a rotating shaft 20 and along the outer diameter of radial shaft seal 10 between housing 30. The sealing characteristics are achieved through the interference of dust lip 11 and primary sealing lip 15 of radial shaft seal 10 with rotating shaft 20, as well as through the interference of outer diameter member 13 of the radial shaft seal 10 and housing 30.

Possible variations to radial shaft seal 10 include an increase or decrease to the interference between the shaft 20 and the oil sealing lip 15 through modifications to the geometry. Outer diameter member 13 of radial shaft seal 10 also may be modified to provide better sealing performance and resistance to rotation of radial shaft seal 10 within housing 30.

Primary sealing lip 15 can be energized through the interference of the lip energizer 14 and outer diameter member 13 of the radial shaft seal 10. The foregoing results in a radial shaft seal 10 that is simple to manufacturer, simple to install, and operates without the need of a spring, a can, or other metal components. Radial shaft seal operates for extended periods without leakage.

In an alternative embodiment, additional structural support can be provided by installing a can next to exterior-facing side 40 of radial shaft seal 10. In such an embodiment, the can extends radially across a face of the radial shaft seal positioned axially away from dust lip 11.

To those skilled in the art to which this invention relates, many changes in construction and widely differing embodiments and applications of the invention can suggest themselves without departing from the spirit and scope of the invention. The disclosures and the descriptions herein are purely illustrative and are not intended to be in any sense limiting. Various aspects of the different embodiments can be combined in different combinations to create new embodiments within the scope of the invention.

What is claimed is:

1. A radial shaft seal for a radial shaft, comprising:
   a seal body formed around an axis with a cross-sectional profile comprising;
   a primary sealing lip comprising a first contact point formed by a meeting of a first surface and a second surface with a primary lip air angle between the first surface and the axis and a primary lip oil angle between the second surface and the axis, wherein the primary lip oil angle is greater than the primary lip air angle, for engaging the radial shaft;
   a dust lip comprising a second contact point formed by a meeting of a third sealing surface and a fourth sealing surface and positioned axially apart from the primary sealing lip toward an exterior side of the radial shaft for engaging the radial shaft, wherein the first contact point and the second contact point are parallel with respect to each other, and wherein the first surface and the fourth surface are connected by a concave radius oriented away from the axis;
   an outer diameter member positioned further away from the axis and radially above the primary sealing lip and the dust lip;
   a first area of pivot movement combined to the outer diameter member for creating strain that resists compression of the outer diameter member;
   a lip energizer positioned radially between the outer diameter member and the primary sealing lip wherein the lip energizer comprises of a top lip, an inner surface, and a concave surface, wherein the concave surface extends between the top lip and the second surface of the primary sealing lip and is oriented perpendicular to the axis, wherein the outer diameter member moves radially toward the lip energizer when the radial shaft seal is installed in a housing; and
   a second area of pivot movement positioned radially between the dust lip and the outer diameter member for creating strain that resists compression of the lip energizer;
   a third area of pivot movement between the inner surface and the concave surface of the lip energizer for creating strain that resists compression of the lip energizer, wherein in an installed position the lip energizer is flexed toward the outer diameter member about the second area of pivot movement and the outer diameter member is flexed toward the lip energizer about the first area of pivot movement to form a section of material between the outer diameter member and the primary sealing lip.

2. The radial shaft seal of claim 1, wherein the outer diameter member and the primary sealing lip form a barrier between an exterior-facing side and an interior-facing side of the radial shaft seal.

3. The radial shaft seal of claim 1, wherein the outer diameter member, the primary sealing lip, and the lip energizer are formed from a single piece of material.

4. The radial shaft seal of claim 3, wherein the lip energizer moves to an engaging position with the outer diameter member forming the section of material.

5. The radial shaft seal of claim 1, wherein the lip energizer biases the primary sealing lip into the radial shaft.

6. The radial shaft seal of claim 1, wherein the outer diameter member moves radially toward the lip energizer when the radial shaft seal is installed in a housing.

7. The radial shaft seal of claim 6, wherein the lip energizer moves radially toward the outer diameter member when the radial shaft seal is installed around a radial shaft.

8. The radial shaft seal of claim 7, wherein a cavity positioned axially from the section of material is formed.

9. A radial shaft seal for a radial shaft, comprising:
   a seal body formed around an axis with a cross-sectional profile comprising;
   a primary sealing lip comprising a first contact point formed by a meeting of a first surface and a second surface with a primary lip air angle between the first surface and the axis and a primary lip oil angle between the second surface and the axis, wherein the primary lip oil angle is greater than the primary lip air angle, for engaging the radial shaft;
   a dust lip comprising a second contact point formed by a meeting of a third sealing surface and a fourth sealing surface and positioned axially apart from the primary sealing lip toward an exterior side of the radial shaft for engaging the radial shaft, wherein the first contact point and the second contact point are parallel with respect to each other, and wherein the first surface and the fourth surface are connected by a concave radius oriented away from the axis;
   an outer diameter member positioned further away from the axis and radially above the primary sealing lip and the dust lip;
   a lip energizer positioned radially between the outer diameter member and the primary sealing lip, wherein the lip energizer comprises of a top lip, an inner surface, and a concave surface, wherein the concave surface extends between the top lip and the second surface of the primary sealing lip and is oriented perpendicular to the axis, wherein the lip energizer moves to an engaging position with the outer diameter member forming a continuous section of material between the outer diameter member and the primary sealing lip, wherein the outer diameter member, the primary sealing lip, and the lip energizer are formed from a single piece of material; and
   a first area of pivot movement combined to the outer diameter member for creating strain that resists compression of the outer diameter member;
   a second area of pivot movement positioned radially between the dust lip and the outer diameter member for creating strain that resists compression of the lip energizer;
   a third area of pivot movement between the inner surface and the concave surface of the lip energizer for creating strain that resists compression of the lip energizer, wherein in an installed position the lip energizer is flexed toward the outer diameter member about the second area of pivot movement and the outer diameter member is flexed toward the lip energizer about the first area of pivot movement to form a section of material between the outer diameter member and the primary sealing lip.

10. The radial shaft seal of claim 9, wherein the seal body comprises an elastomer.

11. The radial shaft seal of claim 10, wherein a cavity is between the outer diameter member and the lip energizer.

12. The radial shaft seal of claim 11, wherein the lip energizer biases the primary sealing lip into the radial shaft.

13. The radial shaft seal of claim 12, wherein the outer diameter member moves radially toward the lip energizer when the radial shaft seal is installed in a housing.

14. The radial shaft seal of claim 13, wherein the lip energizer moves radially toward the outer diameter member when the radial shaft seal is installed around a radial shaft.

15. A radial shaft seal for a radial shaft, comprising:
a seal body formed around an axis with a cross-sectional profile comprising:
an outer diameter member that is a portion of the seal body that is furthest away from the axis;
a primary sealing lip comprising a first contact point formed by a meeting of a first surface and a second surface with an primary lip air angle between the first surface and the axis and an primary lip oil angle between the second surface and the axis, wherein the primary lip oil angle is greater than the primary lip air angle, and wherein the first contact point is the closest point of the cross-sectional profile to the axis;
a lip energizer formed by an inner surface that slopes radially downward toward the axis and axially inward with respect to the seal body, a top lip, and a concave surface oriented perpendicular to the axis and extending between the top lip and the second surface of the primary sealing lip;
a dust lip comprising a second contact point formed by a meeting of a third sealing surface and a fourth sealing surface and positioned axially apart from the primary sealing lip toward an exterior side of the radial shaft for engaging the radial shaft, wherein the first contact point and the second contact point are parallel with respect to each other, and wherein the first surface and the fourth surface are connected by a concave radius oriented away from the axis;
wherein there is a space between the outer diameter member and the top lip of the lip energizer, and wherein in an installed position the lip energizer is flexed toward and in contact with the outer diameter member; and
a first area of pivot movement combined to the outer diameter member for creating strain that resists compression of the outer diameter member;
a second area of pivot movement positioned radially below the outer diameter member for creating strain that resists compression of the lip energizer;
a third area of pivot movement between the inner surface and the concave surface of the lip energizer for creating strain that resists compression of the lip energizer, wherein in an installed position the lip energizer is flexed toward the outer diameter member about the second area of pivot movement and the outer diameter member is flexed toward the lip energizer about the first area of pivot movement to form a section of material between the outer diameter member and the primary sealing lip.

* * * * *